(12) United States Patent
Ohashi et al.

(10) Patent No.: US 6,482,899 B2
(45) Date of Patent: *Nov. 19, 2002

(54) CURABLE RESIN COMPOSITION

(75) Inventors: Junji Ohashi; Tetsuo Hinoma, both of Kawasaki (JP)

(73) Assignee: Ajinomoto Co., Inc., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/292,844

(22) Filed: Apr. 16, 1999

(65) Prior Publication Data

US 2002/0010287 A1 Jan. 24, 2002

(30) Foreign Application Priority Data

Apr. 17, 1998 (JP) .......................... 10-108274
Sep. 4, 1998 (JP) .......................... 10-251141

(51) Int. Cl.$^7$ ...................... C08G 59/14; C08G 59/44; C08G 59/50; C08L 63/02
(52) U.S. Cl. ................ 525/486; 252/186.26; 523/404; 523/428; 525/526; 528/123
(58) Field of Search ................ 525/486, 526; 523/404, 428; 528/123; 252/182.26

(56) References Cited

U.S. PATENT DOCUMENTS

| 3,280,074 | A | * | 10/1966 | McCaleb et al. ............ 528/123 |
| 3,862,260 | A | * | 1/1975 | Sellers et al. ........... 525/486 X |
| 3,963,666 | A | * | 6/1976 | Schreiber et al. ....... 523/428 X |
| 4,111,909 | A | * | 9/1978 | Simons ...................... 528/123 |
| 4,348,505 | A | * | 9/1982 | Di Benedetto et al. . 252/182.26 X |
| 4,534,882 | A | * | 8/1985 | Bilow et al. ............ 252/182.26 |
| 4,542,202 | A | | 9/1985 | Takeuchi et al. .............. 528/96 |
| 4,546,155 | A | | 10/1985 | Hirose et al. ................ 525/504 |
| 4,689,388 | A | | 8/1987 | Hirai et al .................... 528/104 |
| 4,828,771 | A | * | 5/1989 | Kishima et al. ........ 528/123 X |
| 4,833,226 | A | | 5/1989 | Ishimura et al. .............. 528/45 |
| 5,057,557 | A | * | 10/1991 | Treybig et al. ............. 523/404 |
| 5,077,355 | A | * | 12/1991 | Nagase et al. ............... 525/526 |
| 5,155,182 | A | * | 10/1992 | Burba et al. ........ 252/182.26 X |
| 5,219,956 | A | * | 6/1993 | Fukuoka ..................... 525/526 |
| 5,430,112 | A | | 7/1995 | Sakata et al. ................ 525/526 |
| 5,543,486 | A | | 8/1996 | Abe et al. ...................... 528/92 |
| 5,567,748 | A | * | 10/1996 | Klein et al. ............. 523/404 X |
| 5,591,814 | A | | 1/1997 | Muroi et al. ................. 525/452 |

FOREIGN PATENT DOCUMENTS

| EP | 0 304 503 | 3/1989 |
| EP | 0 594 133 | 4/1994 |
| EP | 0 622 488 | 7/1995 |
| WO | WO 97/21751 | 6/1997 |

* cited by examiner

*Primary Examiner*—Richard D. Lovering
(74) *Attorney, Agent, or Firm*—Oblon, Spivak, McClelland, Maier & Neustadt, P.C.

(57) ABSTRACT

A latent curing agent is disclosed for epoxy resin, comprising a reaction product obtainable by allowing (A) an epoxy compound having more than one epoxy groups on the average in the molecule and (B) a compound having in the molecule both a tertiary amino group and at least one functional group selected from the group consisting of OH group, SH group, NH group, $NH_2$ group, COOH group and $CONHNH_2$ group, to react on each other in the presence of 0.05–5.0 equivalents of water per 1 equivalent of the epoxy group of Compound (A); and a curable epoxy resin composition comprising such curing agent and an epoxy compound having more than one epoxy group on the average in the molecule.

15 Claims, No Drawings

CURABLE RESIN COMPOSITION

BACKGROUND OF THE INVENTION

1. Field of the Invention

The present invention relates to a latent curing agent for epoxy resin and a curable epoxy resin composition having the same incorporated therein, and in particular to a curing agent for epoxy resin providing storage stability and low-temperature rapid curability to an epoxy resin composition, as well as a curable epoxy resin composition having the same incorporated therein which is excellent in storage stability and has low-temperature rapid curability.

Further, the present invention relates to a latent curing agent for epoxy resin and a curable epoxy resin composition which are suitable for application in the electronics field such as encapsulants for semiconductor, anisotropic conductive films, conducting composites, etc.

2. Background Prior Art

Based on the recent remarkable development in the field of electronics, the density of semiconductor element circuits has been rapidly increased and simultaneously, large-scale production thereof has become feasible, whereby the miniaturization and high-performance of electronic devices are now in rapid progress. Further, as these electronic devices become into wide use, improved workability and reduced costs in large-scale production have got demanded. Further, with respect to epoxy resin used as adhesive for these electronic devices and latent curing agent for such epoxy resin, there is a need for improved high-performance in various physical. properties. As a matter of course, the utilization of epoxy resin is not limited to this.

The epoxy resin composition includes a two-pack type which is used by mixing an epoxy resin as the main agent with a curing agent just before use and a one-pack type having an epoxy resin as the main agent previously mixed with a curing agent. Of the two, the one-pack type is preferably used because it can prevent erroneous formulation and enables machinery automation on line. For the one-pack type epoxy resin composition; is needed a so-called latent curing agent which does not react with the epoxy resin compound at room temperature, and is caused to react and cure upon heating.

As for the latent curing agent, some curing agents have been proposed so far, and typical examples thereof include dicyandiamide, dibasic acid dihydrazide, boron trifluoride amine complex salt, guanamines, melamine, imidazoles, etc. However, an epoxy resin composition resulting from mixing an epoxy compound with dicyandiamide, melamine or a guanamine is excellent in storage stability, but is disadvantageous in that it requires, for curing, a long time at high temperatures of 150° C. or more. Further, such epoxy resin composition is often used in combination with a curing accelerator to reduce curing time. The addition of a curing accelerator indeed leads to a reduction in the curing time of the curing epoxy resin composition but causes such problem that the storage stability thereof is significantly deteriorated. The epoxy resin compositions having a dibasic acid dihydrazide or an imidazole incorporated therein as the latent curing agent, are cured at relatively low temperatures but poor in storage stability. The boron trifluoride amine complex is highly hygroscopic and exerts adverse effects on various characteristics of a cured product from an epoxy resin composition having said complex incorporated therein. In these circumstances, a latent curing agent for epoxy resin, which gives an epoxy resin composition excellent in storage stability with low-temperature rapid curability, is highly desired.

To improve or solve these problems, JP 56-155222A and JP 57-100127A propose curing agents wherein dialkyl amines are addition-reacted with epoxy compounds, and JP 59-53526A proposes curing agents wherein an aminoalcohol or aminophenol is addition-reacted with an epoxy compound. Further, U.S. Pat. Nos. 406,625 and 4,268,656 propose curing agents wherein imidazole compounds or N-methyl piperazine is addition-reacted with epoxy compounds at their secondary amino groups.

However, the curing agents described above do not sufficiently confer storage stability and low-temperature curability on epoxy resin compositions in which they have been incorporated. In particular, those epoxy resin compositions wherein bisphenol F type epoxy compounds or reaction diluents such as monoepoxy compounds or diepoxy compounds have been used, do not exhibit satisfactory storage stability.

Further, phenol resin, dicyandiamide, hydrazide compounds or the like have been used heretofore as a latent curing agent, but they require, for curing, heating treatment in an oven at 150 to 200° C. for a long time. Recently, there is a need for rapidly curable resin compositions which can be cured in a short time, with the view of improving workability if the step of assembling semiconductor devices and reducing manufacturing costs. In addition, as circuits become highly densified on printed circuit boards, etc., a reduction in accuracy due to thermal stress upon high-temperature curing, has been worried about, and also from the viewpoint of energy costs, there has been a need for curing at relatively low temperatures to minimize the thermal history of printed circuit boards, etc.

As typical examples of latent curing agents with low-temperature rapid curing properties, e.g. amine adduct type latent curing agents are known and JP 9-92029A, for example, describes an example where a commercial latent curing agent "Ajicure" (a product of Ajinomoto Co., Ltd.) is used as an conductive paste.

On the other hand, as semiconductor production technology rapidly advances, it has become impossible to ignore the physical properties of a curing agent per se incorporated in curable epoxy resin compositions as well as its effect on electrical reliability, and there has been a need for latent curing agents more suitable in the field of electronics than those conventionally used.

SUMMARY OF THE INVENTION

It is an object of the present invention to provide a latent curing agent which can give an epoxy resin composition excellent in storage stability and low-temperature rapid curable properties or curability, and furthermore, to a rapidly curable epoxy resin composition resulting from having the same mixed with an epoxy compound, which maintains excellent storage stability and is curable at relatively low temperatures, that is, 80 to 120° C. in a short time.

Another object of the present invention is to provide a latent curing agent for epoxy resin and a curable epoxy resin composition, which have low-temperature rapid curing properties, are excellent in heat resistance, electrical reliability, etc., and are suitable in uses in the electronics field such as encapsulants for semiconductor, anisotropic conductive films, conducting composites, etc.

As a result of their eager study in view of the various problems described above, the present inventors have found that an addition product obtainable by addition reaction in the presence of water, with an epoxy compound, of a compound having in the molecule both a tertiary amino group and a functional group such as OH group, SH group, NH group, NH$_2$ group, COOH group, CONHNH$_2$ group or the like capable of reacting with an epoxy compound, gives when mixed with an epoxy compound, a curable epoxy resin composition superior in storage stability and low-temperature rapid curability. On the basis of these findings, the present inventors have completed a first invention.

Accordingly, the present invention relates to a latent curing agent for epoxy resin, comprising a reaction product obtainable by allowing the 2 kinds of compounds, that is, (A) an epoxy compound having more than one (1) epoxy groups on the average in the molecule and (B) a compound having in the molecule both a tertiary. amino group and at least one functional group selected from the group consisting of OH group, SH group, NH group, NH$_2$ group, COOH group and CONHNH$_2$ group, to react on each other in the presence of 0.05–5.0 equivalents of water per 1 equivalent of the epoxy group of Compound (A). Incidentally, it is added that with respect to the relationship in equivalence between epoxy group and water, 1 epoxy group corresponds to 1 water molecule.

The present invention also relates to a latent curing agent for epoxy resin, comprising a reaction product obtainable by allowing the 3 kinds of compounds, that is, (A) an epoxy compound having more than one (1) epoxy groups on the average in the molecule, (B) a compound having in the molecule both a tertiary amino group and at least one functional group selected from the group consisting of OH group, SH group, NH group, NH$_2$ group, COOH group and CONHNH$_2$ group, and (C) a compound having in the molecule at least one functional group selected from the group consisting of NH$_2$ group and CONHNH$_2$ group or in the molecule at least 2 functional groups selected from the group consisting of OH group, SH group, NH group, NH$_2$ group, COOH group and CONHNH$_2$ group (provided that a compound having an epoxy group or tertiary amino group in the molecule is excluded), to react on one another in the presence of 0.05 to 5.0 equivalents of water per 1 equivalent of the epoxy group of Compound (A).

Furthermore, the present invention relates to a curable epoxy resin composition comprising (x) an epoxy compound having more than one (1) epoxy groups on the average in the molecule and (y) the said latent curing agent for epoxy resin as the essential ingredients, and optionally, (z) inorganic filler(s).

Further, as a result of their eager study in view of the problems in the prior art as described above, the present inventors have found that a specific amine adduct-type latent curing agent has low-temperature rapidly curing properties and simultaneously, improves the heat resistance and electrical reliability of a product resulting from curing an epoxy resin composition as compared with a conventional one, and further improves electrical conductivity when used in conducting composites. On the basis of these findings, the present inventors have completed a second invention.

Accordingly, the present,invention relates to a latent curing agent for epoxy resin, comprising a reaction product of the following three kinds of compounds (a), (b) and (c):

(a) an alicyclic epoxy compound having 2 or more epoxy groups in the molecule;
(b) a compound having in the molecule both a tertiary amino group and at least one functional group selected from the group consisting of OH group, SH group, NH group, NH$_2$ group, COOH group and CONHNH$_2$ group; and
(c) a compound having in the molecule at least one functional group selected from the group consisting of NH$_2$ group and CONHNH$_2$ group or in the molecule at least 2 functional groups selected from the group consisting of OH group, SH group, NH group and COOH group (provided that a compound having an epoxy group or tertiary amino group in the molecule is excluded).

The present invention also relates to a latent curing agent for epoxy resin, comprising a reaction product of the following four kinds of compounds (a), (b), (c) and (d):

(a) an alicyclic epoxy compound having 2 or more epoxy groups in the molecule;
(b) a compound having in the molecule both a tertiary amino group and at least one functional group selected from the group consisting of OH group, SH group, NH group, NH$_2$ group, COOH group and CONHNH$_2$ group;
(c) a compound having in the molecule at least one functional group selected from the group consisting of NH$_2$ group and CONHNH$_2$ group or in the molecule at least 2 functional groups selected from the group consisting of OH group, SH group, NH group and COOH group (provided that a compound having an epoxy group or tertiary amino group in the molecule is excluded); and
(d) a glycidyl compound having 2 or more epoxy groups in the molecule.

Furthermore, the present invention relates to a curable epoxy resin composition comprising one of the said latent curing agents for epoxy resin and an epoxy compound having 2 or more epoxy groups in the molecule.

In addition, the present invention relates to a curable epoxy resin composition comprising one of the said latent curing agents for epoxy resin, an epoxy compound having 2 or more epoxy groups in the molecule, and inorganic filler (s).

The first and second inventions described above constitute, as can be seen from the foregoing and following description, a group of inventions so linked as to form a single general inventive concept.

DETAILED DESCRIPTION OF THE INVENTION

Hereinafter, the present invention will be described in detail.

First, the first invention will be described.

Compound (A) as one of the starting materials for synthetic reaction of the inventive latent curing agent for epoxy resin, that is, an epoxy compound having more than one (1) epoxy group on the average in the molecule, is not particularly limited, and any epoxy compound having more than one epoxy group on the average in the molecule can be used.

For example, mention can be made of epoxy compounds having more than one epoxy groups on the average in the molecule, which are represented by any of the general formulae (1) to (3) below. Further, mention is made of, e.g., epoxy compounds having more than one epoxy groups on the average in the molecule that are on the alicyclic hydrocarbon ring and/or that are bound directly to the carbon atom(s) forming the alicyclic hydrocarbon ring. Furthermore, any epoxy compounds having 2 kinds or more of these epoxy groups in the molecule where the number of such epoxy groups totals more than one on the average.

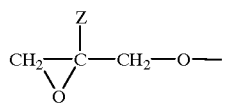
(1)

which is a substituted or unsubstituted glycidyl ether group wherein Z is a hydrogenatom, a methyl group or an ethyl group.

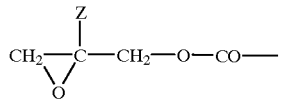
(2)

which is a substituted or unsubstituted glycidyl ester group wherein Z is a hydrogen atom, a methyl group or an ethyl group.

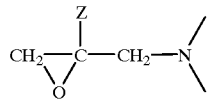
(3)

which is a substituted or unsubstituted 1,2-epoxypropyl group wherein Z is a hydrogen atom, a methyl group or an ethyl group.

The epoxy compounds containing more than one substituted or unsubstituted glycidyl ether groups on the average in the molecule, represented by the general formula (1), above, include substituted or unsubstituted glycidyl ether compounds obtainable by reacting an epihalohydrin with a polyhydric phenol compound such as bisphenol A, bisphenol F, bisphenol S, catechol, resorcinol, phenol novolak resin, resol resin or the like, or with a polyhydric alcohol compound such as a compound obtainable by subjecting glycerin, polyethylene glycol, or a polyhydric phenol compound to addition reaction with an alkylene oxide containing 2 to 4 carbon atoms.

The epoxy compounds having more than one substituted or unsubstituted glycidyl ester groups on the average in the molecule, represented by the general formula (2) above, include substituted or, unsubstituted glycidyl ester compounds obtainable by allowing an aliphatic polybasic carboxylic acid such as adipic acid, sebacic acid or the like, or an aromatic polybasic carboxylic acid such as phthalic acid, terephthalic acid or the like to react with an epihalohydrin.

The epoxy compounds having more than one N-substituted or unsubstituted 1,2-epoxypropyl groups on the average in the molecule, represented by the general formula (3) above, include substituted or unsubstituted glycidylamine compounds obtainable by allowing, e.g., 4,4'-diaminodiphenyl methane, aniline, m-aminophenol or the like to react with an epihalohydrin.

The epoxy compounds having more than one epoxy groups on the average in the molecule that are on the alicyclic hydrocarbon ring and/or that are bound directly to the carbon atom(s) forming the alicyclic hydrocarbon ring include, e.g., epoxy compounds represented by the following general formula (4) or (5).

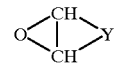
(4)

wherein Y represents an optionally substituted monocyclic, polycyclic or bridged cyclic hydrocarbon ring containing 2 to 8 carbon atoms.

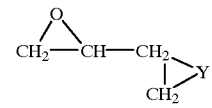
(5)

wherein Y has the same meanings as defined above in the general formula (4).

Examples of the epoxy compounds represented by the general formula (5) above may be those shown by the formulae (5-1) to (5-8) below.

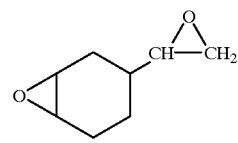
(5-1)

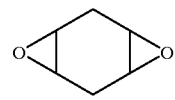
(5-2)

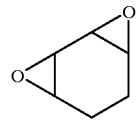
(5-3)

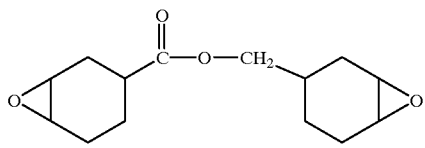
(5-4)

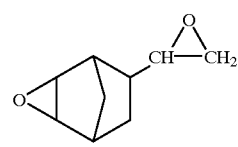
(5-5)

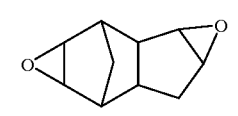
(5-6)

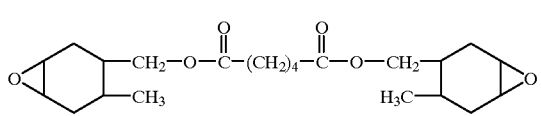
(5-7)

(5-8)

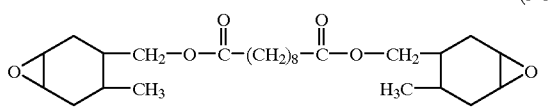

Further, the epoxy compounds having 2 kinds or more of these epoxy groups in the molecule wherein the total number of the epoxy groups is more than one on the average include substituted or unsubstituted glycidyl ether eater compounds obtainable by allowing a hydroxycarboxylic acid such as p-oxybenzoic acid, β-oxynaphthoic acid or the like to react with an epihalohydrin, compounds having both a glycidyl ether group and an alicyclic epoxy group in the molecule as shown by the following formula (6), and the like.

(6)

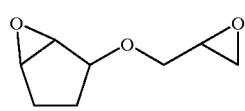

Further, these epoxy compounds may be accompanied by monoepoxy compounds within the range in which the effects of the invention are not inhibited. Such monoepoxy compounds include, e.g., monoepoxy compounds such as butyl glycidyl ether, phenyl glycidyl ether, p-tert-butyl phenyl glycidyl ether, sec-butyl phenyl glycidyl ether, and glycidyl methacrylate.

Epihalohydrin referred to herein is represented by the general formula (7) below, and includes, e.g., epichlorohydrin, epibromohydrin, 1,2-epoxy-2-methyl-3-chloropropane, 1,2-epoxy-2-ethyl-3-chloropropane, etc.

(7)

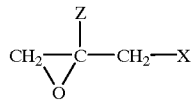

wherein Z represents a hydrogen. atom, a methyl group or an ethyl group, and X represents a halogen atom.

Compounds (A) described above may be used each singly or in combination of two or more thereof.

Compound (B) as another starting material for synthetic reaction of the inventive latent curing agent for epoxy resin, that is, a compound having in the molecule both a tertiary amino group and at least one functional group selected from the group consisting of OH group, SH group, NH group, $NH_2$ group, COOH group and $CONHNH_2$ group is represented by, e.g., the following general formula (8).

(8)

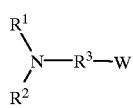

wherein W represents an OH group, SH group, NH group, $NH_2$ group, COOH group or $CONHNH_2$ group, $R^1$ and $R^2$ represent independently a $C_1$ to $C_{20}$ alkyl group, a $C_2$ to $C_{20}$ alkenyl group, an aralkyl group such as benzyl group, or one of the above groups wherein some carbon atom(s) in the carbon chain are replaced by other atom(s) (e.g., oxygen) or some hydrogen atom(s) on the carbon chain are replaced by a halogen, a functional group represented by W defined above or the like, and $R^3$ is a similar to $R^1$ and $R^2$ defined above but divalent residue. Furthermore, $R^1$ and $R^2$ or $R^1$, $R^2$ and $R^3$ may be bound to one another to form a ring.

As Compound (B), e.g., those compounds containing a tertiary amino group in the heterocyclic ring represented by the following general formula (9), (10) or (12) can also be mentioned as effective compounds.

(9)

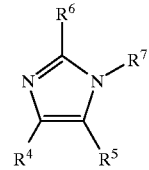

wherein $R^4$, $R^5$, $R^6$ and $R^7$ represent independently a hydrogen atom, one of the same groups as $R^1$ and $R^2$ defined in the general formula (8) above, an aryl group which may be substituted with an alkyl or aryl group, or a functional group represented by W in the general formula (8) above, and at least one of $R^4$, $R^5$, $R^6$ and $R^7$ represents a functional group represented by W or a group containing a functional group represented by W, except the case where $R^7$ is a hydrogen atom. Even in the case where $R^7$ is a hydrogen atom, $R^4$, $R^5$ and $R^6$ can be a functional group represented by W or a group containing a functional group represented by W.

(10)

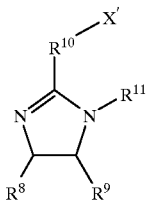

wherein $R^8$, $R^9$ and $R^{11}$ represent independently a hydrogen atom, one of the same groups as $R^1$ and $R^2$ defined in the general formula (8) above, or an aryl group which may be substituted with an alkyl or aryl group, $R^{10}$ is a similar to $R^1$ and $R^2$ in the general formula (8) above but divalent residue, or an arylene group which may be substituted with an alkyl or aryl group, and X' is a hydrogen or a group represented by the following general formula (11):

(11)

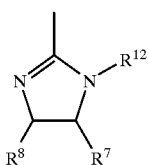

wherein $R^8$ and $R^9$ have the same meanings as in the general formula (10) above, and $R^{12}$ is a hydrogen atom, one of the same groups as $R^1$ and $R^2$ defined in the general formula (8) above, or an aryl group which may be substituted with an alkyl or aryl group, and in the case where none of $R^{11}$ and $R^{12}$ are a hydrogen atom, at least one of $R^8$, $R^9$, $R^{10}$, $R^{11}$ and $R^{12}$ represents a functional group represented by W or a group containing a functional group represented by W. Even in the case where $R^{11}$ and/or $R^{12}$ is a hydrogen atom, $R^8$, $R^9$, $R^{10}$, $R^{11}$ and $R^{12}$ can be a functional group represented by W or a group containing a functional group represented by W.

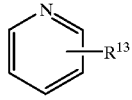

(12)

wherein $R^{13}$ is a functional group represented by W, or a similar group to $R^1$ or $R^2$ but containing a functional group represented by W.

Such compound (B), that is, a compound containing, in the molecule, both tertiary amino group and at least one functional group selected from the group consisting of OH group, SH group, NH group, $NH_2$ group, COOH group and $CONHNH_2$ group, includes, e.g., 2-dimethylaminoethanol, 1-methyl-2-dimethylaminoethanol, 1-phenoxymethyl-2-dimethylaminoethanol, 2-diethylaminoethanol, 1-butoxymethyl-2-dimethylaminoethanol, 2-methylimidazole, 2-ethyl-4-methylimidazole, 2-undecylimidazole, 2-heptadecylimidazole, 2-phenylimidazole, 1-aminoethyl-2-methylimidazole, 1-(2-hydroxy-3-phenoxypropyl)-2-methylimidazole, 1-(2-hydroxy-3-phenoxypropyl)-2-ethyl-4-methylimidazole, 1-(2-hydroxy-3-butoxypropyl)-2-methylimidazole, 1-(2-hydroxy-3-butoxypropyl)-2-ethyl-4-methylimidazole, 1-(2-hydroxy-3-phenoxypropyl)-2-phenylimidazoline, 1-(2-hydroxy-3-butoxypropyl)-2-methylimidazoline, 2-methylimidazoline, 2,4-dimethylimidazoline, 2-ethylimidazoline, 2-ethyl-4-methylimidazoline, 2-benzylimidazoline, 2-phenylimidazoline, 2-(o-tolyl)-imidazoline, tetramethylene-bis-imidazoline, 1,1,3-trimethyl-1,4-tetramethylene-bis-imidazoline, 1,3,3-trimethyl-1,4-tetramethylene-bis-imidazoline, 1,1,3-trimethyl-1,4-tetramethylene-bis-4-methylimidazoline, 1,3,3-trimethyl-1,4-tetramethylene-bis-4-methylimidazoline, 1,2-phenylene-bis-imidazoline, 1,3-phenylene-bis-imidazoline, 1,4-phenylene-bis-imidazoline, 1,4-phenylene-bis-4-methylimidazoline, 2-(dimethylaminomethyl)phenol, 2,4,6-tris(dimethylaminomethyl)phenol, N-β-hydroxyethylmorpholine, 2-dimethyl aminoethane thiol, 2-mercaptobenzoimidazole, 2-mercaptobenzothiazole, 2-mercaptopyridine, 4-mercaptopyridine, N,N-dimethylaminobenzoic acid, N,N-dimethylglycine, nicotinic acid, isonicotinic acid, picolinic acid, N,N-dimethyl glycine hydrazide, nicotinic acid hydrazide, isonicotinic acid hydrazide, dimethyl aminopropyl amine, diethyl aminopropyl amine, dipropyl aminopropyl amine, dibutyl aminopropyl amine, dimethyl aminoethyl amine, diethyl aminoethyl amine, dipropyl aminoethyl amine, dibutyl aminoethyl amine, N-aminoethyl piperazine, dimethyl aminoethyl piperazine, diethyl aminoethyl piperazine, etc.

Compound (B) is preferably a compound having a tertiary amino group and at least one functional group selected from the group consisting of OH group, NH group and $NH_2$ group.

Such compounds include tertiary amino group-containing alcohol compounds, such as 2-dimethylaminoethanol, 1-methyl-2-dimethylaminoethanol, 1-phenoxymethyl-2-dimethylaminoethanol, 2-diethylaminoethanol, 1-butoxymethyl-2-dimethylaminoethanol, N-β-hydroxyethyl morpholine, 1-(2-hydroxy-3-phenoxypropyl)-2-methylimidazole, 1-(2-hydroxy-3-phenoxypropyl)-2-ethyl-4-methylimidazole, 1-(2-hydroxy-3-butoxypropyl)-2-methylimidazole, 1-(2-hydroxy-3-butoxypropyl)-2-ethyl-4-methylimidazole, 1-(2-hydroxy-3-phenoxypropyl)-2-phenylimidazoline, 1-(2-hydroxy-3-butoxypropyl)-2-methylimidazoline, etc.; tertiary amino group-containing phenol compounds such as 2-(dimethylaminomethyl)phenol, 2,4,6-tris(dimethylaminomethyl)phenol, etc.; and primary or secondary amino group-containing tertiary amine compounds such as 2-methylimidazoline, 2,4-dimethylimidazoline, 2-ethylimidazoline, 2-ethyl-4-methylimidazoline, 2-benzylimidazoline, 2-phenylimidazoline, 2-(o-tolyl)-imidazoline, tetramethylene-bis-imidazoline, 1,1,3-trimethyl-1,4-tetramethylene-bis-imidazoline, 1,3,3-trimethyl-1,4-tetramethylene-bis-imidazoline, 1,1,3-trimethyl-1,4-tetramethylene-bis-4-methylimidazoline, 1,3,3-trimethyl-1,4-tetramethylene-bis-4-methylimidazoline, 1,2-phenylene-bis-imidazoline, 1,3-phenylene-bis-imidazoline, 1,4-phenylene-bis-imidazoline, 1,4-phenylene-bis-4-methylimidazoline, dimethyl aminopropyl amine, diethyl aminopropyl amine, dipropyl aminopropyl amine, dibutyl aminopropyl amine, dimethyl aminoethyl amine, diethyl aminoethyl amine, dipropyl aminoethyl amine, dibutyl aminoethyl amine, N-aminoethyl piperazine, dimethyl aminoethyl piperazine, diethyl aminoethyl piperazine, etc.

Particularly preferable among these are tertiary amino group-containing alcohol compounds(and primary or secondary group-containing tertiary amine compounds.

More preferable examples of the tertiary amino group-containing alcohol compounds described above are those having 5- or 6-membered nitrogenous heterocyclic ring structure, such as 1-(2-hydrogy-3-phenoxypropyl)-2-methylimidazole, 1-(2-hydroxy-3-phenoxypropyl)-2-ethyl-4-methylimidazole, 1-(2-hydroxy-3-butoxypropyl)-2-methylimidazole, 1-(2-hydroxy-3-butoxypropyl)-2-ethyl-4-methylimidazole, 1-(2-hydroxy-3-phenoxypropyl)-2-phenylimidazoline, 1-(2-hydroxy-3-butoxypropyl)-2-methylimidazoline, etc., and particularly preferable are those having an imidazole skeleton, such as 1-(2-hydroxy-3-phenoxypropyl)-2-methylimidazole, 1-(2-hydroxy-3-phenoxylpropyl)-2-ethyl-4-methylimidazole, 1-(2-hydroxy-3-butoxypropyl)-2-methylimidazole, 1-(2-hydroxy-3-butoxypropyl)-2-ethyl-4-methylimidazole, etc.

More preferable examples of the primary or secondary group-containing tertiary amine compounds described above are those having a 5- or 6-membered nitrogenous heterocyclic ring structure, such as 2-methylimidazole, 2-ethyl-4-methylimidazole, 2-undecylimidazole, 2-heptadecylimidazole, 2-phenylimidazole, 1-aminoethyl-2-methylimidazole, 2-methylimidazoline, 2,4-dimethylimidazoline, 2-ethylimidazoline, 2-ethyl-4-methylimidazoline, 2-benzylimidazoline, 2-phenylimidazoline, 2-(o-tolyl)-imidazoline, tetramethylene-bis-imidazoline, 1,1,3-trimethyl-1,4-tetramethylene-bis-imidazoline, 1,3,3-trimethyl-1,4-tetramethylene-bis-imidazoline, 1,1,3-trimethyl-1,4-tetramethylene-bis-4-methylimidazoline, 1,3,3-trimethyl-1,4-tetramethylene-bis-4-methylimidazoline, 1,2-phenylene-bis-imidazoline, 1,3-phenylene-bis-imidazoline, 1,4-phenylene-bis-imidazoline, 1,4-phenylene-bis-4-methylimidazoline, N-aminoethyl piperazine, dimethyl aminoethyl piperazine, diethyl aminoethyl piperazine, etc., and particularly preferable are those having an imidazole skeleton, such as 2-methylimidazole, 2-ethyl-4-methylimidazole, 2-undecylimidazole, 2-heptadecylimidazole, 2-phenylimidazole and 1-aminoethyl-2-methylimidazole, etc.

Compounds (B) described above may be used each singly or can be used in combination of two or more thereof, to react with Compound (A).

Compound (C) as the remaining starting material for the synthetic reaction of the inventive latent curing agent for epoxy resin, that is, a compound having in the molecule at least one functional group selected from the group consisting of $NH_2$ group and $CONHNH_2$ group, or in the molecule at least 2 functional groups selected from the group consisting of OH group, SH group, NH group, $NH_2$ group, COOH group and $CONHNH_2$ group (provided that those compounds having an epoxy group or a tertiary amino group in the molecule are excluded), includes, e.g., amine compounds such as piperazine, aniline and cyclohexyl amine; polybasic carboxylic acids such as adipic acid, phthalic acid, 3,9-bis(2-carboxyethyl)-2,4,8,10-tetraoxaspiro [5,5] undecane; polyvalent thiols such as 1,2-dimercaptoethane and 2-mercaptoethyl ether; hydrazide compounds such as phenyl acetic acid hydrazide; amino acids such as alanine and valine; compounds having 2 kinds or more of functional groups, such as 2-mercaptoethanol, 1-mercapto-3-phenoxy-2-propanol, mercaptoacetic acid, N-methyl ethanol amine, diethanol amine, hydroxyaniline, N-methyl-o-aminobenzoic acid, anthranilic acid, sarcosine, hydroxybenzoic acid and lactic acid; polyhydric alcohols such as pentaerythritol, sorbitol, trimethylolpropane, trimethylolethane and tris (hydroxyethyl) isocyanurate; and polyhydric phenols.

Compound (C) is particularly preferably a polyhydric phenol compound, and examples thereof can be bisphenol A, bisphenol F, bisphenol S, hydroquinone, catechol, resorcinol, pyrogallol, phenol novolak resin and resol resin.

Compounds (C) described above may be used each singly or can be used in combination of two or more thereof, to react with Compounds,(A) and (B).

In the case where the inventive curing agent for epoxy resin is to be obtained by reacting the two compounds i.e., Compounds (A) and (B), when Compound (B) is a compound having in the molecule both a tertiary amino group and at least one functional group selected from the group consisting of OH group, SH group, COOH group and $CONHNH_2$ group, then the ratio of the respective compounds to be used for producing the curing agent for epoxy resin is a ratio of 0.8 to 2.5 equivalents, preferably 0.9 to 1.5 equivalents of the epoxy group of Compound (A) per 1 equivalent of the active hydrogen in the active hydrogen-containing functional group (i.e., the OH group, SH group, COOH group and $CONHNH_2$ group) of Compound (B), in other words, Compounds (A) and (B) are allowed to react on each other in such ratio that Compound (A) in an amount of 0.8 to 2.5 equivalents, preferably 0.9 to 1.5 equivalents in terms of the epoxy group thereof is allowed to react on Compound (B) in an amount of 1 equivalent in terms of the active hydrogen in the active hydrogen-containing functional group thereof. If the amount of the epoxy group is less than 0.8 equivalents per 1 equivalent of the active hydrogen, then the softening temperature of the resulting latent curing agent for epoxy resin is low, its grinding is difficult, and upon incorporation thereof as the latent curing agent into an epoxy compound, sufficient storage stability cannot be obtained, while given 2.5 equivalents or more, the softening temperature of the reaction product gets too high, and upon incorporation thereof as the latent curing agent into an epoxy compound, sufficient rapid curing properties are not exhibited while the resulting cured product becomes heterogeneous. Further, in the same case, when Compound (B),is a compound having in the molecule both a tertiary amine group and at least functional group selected from the group consisting of NH group and $NH_2$ group, the ratio for this reaction is a ratio of 0.4 to 1.1 equivalents of the epoxy group of Compound (A) to 1 equivalent of the active hydrogen of the active hydrogen-containing functional group (i.e., NH group and $NH_2$ group) of Compound (B). This is because if the epoxy group of Compound (A) is in an amount of less than 0.4 equivalents, sufficient storage stability cannot be obtained upon incorporation of the resulting reaction product as the latent curing agent into an epoxy compound, while given 1.1 equivalents or more, there occurs gelation during the addition reaction. Incidentally, with respect to the relationship in equivalence between active hydrogen and epoxy group, 1 epoxy group corresponds to 1 active hydrogen atom.

In the case where the 3 compounds, that is, Compound (A), Compound (B) and Compound (C) are to be used to produce the curing agent for epoxy resin, when Compound (B) is a compound having in the molecule, both a tertiary amino group (and at least one functional group selected from the group consisting of OH group, SH group, COOH group and $CONHNH_2$ group, then the ratio of the respective compounds to be used for producing the curing agent for epoxy resin is a ratio of 0.5 to 2.5 equivalents, preferably 0.6 to 1.5 equivalents of the epoxy group of Compound (A) per 1 equivalent of the total active hydrogen in both Compounds (B) and (C), and simultaneously Compound (C) is used preferably in an amount of 2-fold moles or less relative to Compound (B). Less than 0.5 equivalents of the epoxy group from Compound (A) does not give sufficient storage stability upon incorporation of the resulting reaction product as the latent curing agent into an epoxy compound, while given 2.5 equivalents or more, the softening temperature of the reaction product gets too high, and upon incorporation thereof as the latent curing agent into an epoxy compound, sufficient rapid curing is not exhibited while the resulting cured product becomes heterogeneous. Further, if Compound (C) exceeds 2-fold moles relative to Compound (B), curing properties are worsened. In addition, in the same case where the 3 compounds, i.e., Compounds (A), (B) and (C) are to be used to produce the curing agent for epoxy resin, when Compound (B) is a compound having, in the molecule, both a tertiary amino group and at least one functional group selected from the group consisting of NH group and $NH_2$ group, then the ratio of the respective compounds to be used is a ratio of 0.2 to 1.1 equivalents of the epoxy group in Compound (A) per 1 equivalent of the total active hydrogen in both Compounds if (B) and (C). If the epoxy group from Compound (A) is less than 0.2 equivalent, sufficient storage stability cannot be attained upon incorporation of the resulting reaction product as the latent curing agent into an epoxy compound, while in an amount of more than 1.1 equivalents, the softening temperature of the reaction product gets too high, and upon incorporation thereof as the latent curing agent, there does not occur sufficiently rapid curing while the resulting cured product is rendered heterogeneous.

The 2 compounds, i.e., Compounds (A) and (B) or the 3 compounds, i.e., Compounds (A), (B) and (C) are allowed to react on each other or one another in the presence of 0.05 to 5.0 equivalents, preferably 0.1 to 2.0 equivalents of water, per 1 equivalent of the epoxy group of Compound (A), whereby the inventive latent curing agent for epoxy resin can be obtained. Usually, trace amounts of water are also contained in Compounds (A), (B) and (C) as the starting materials but are insufficient to achieve the effects of the present invention. According to the present invention, water is further added for reaction in an amount of 0.05 to 5.0 equivalents per 1 equivalent of the epoxy group in Compound (A), whereby the inventive latent curing agent for epoxy resin can be obtained. If the amount of water is less than 0.05 equivalents, sufficient storage stability cannot be achieved upon incorporation of the resulting reaction product as the latent curing agent into an epoxy compound, while an amount of 5.0 or more equivalents is not practical because the more time and energy are required to remove the excessive water after reaction and before grinding.

The inventive curing agent for epoxy resin can be obtained as addition products having arbitrary softening temperatures by changing the kind and mixing ratio of Compounds (A), (B) and (C) and the ratio of water for reaction, and those having softening temperatures of 60 to 180° C. are preferable. If the latent curing agent with a softening temperature of less than 60° C. is incorporated into an epoxy compound, the resulting epoxy resin composition is inferior in storage stability at room temperature, while the latent curing agent with a softening temperature of more than 180° C. does not bring about sufficient curing property.

The inventive latent curing agent for epoxy resin can be obtained, e.g., by sufficiently mixing Compound (A), Compound (B) and water, or Compound (A), Compound (B), Compound (C) and water, gelatinizing the mixture at room temperature, completing the reaction at a temperature of 80 to 150° C., then solidifying the resulting reaction mixture by cooling, and grinding the solidified mixture. This reaction may be conducted in a solvent such as toluene, tetrahydrofuran, methyl ethyl ketone or dimethylformamide, followed by removing the solvent, solidification and grinding. Further, water may be either completely dissolved in, or dispersed without being completely dissolved in, Compounds (A) and (B), or Compounds (A), (B) and (C), or these compounds to which a solvent has been added.

The inventive latent curing agent for epoxy resin can also be used in combination with curing agents known in the art, such as acid anhydrides, dicyandiamide, hydrazide compounds, guanamines, melamines, etc.

The inventive latent curing agent for epoxy resin can be put in commercial distribution as such or after added with a curing agent known in the art.

Further, the inventive curable epoxy resin composition is a resin composition comprising (x) an epoxy compound having more than one (1) epoxy groups on the average in the molecule and (y) an inventive latent curing agent for epoxy resin, as the essential ingredients.

The epoxy compound (x) having more than one epoxy groups on the average in the molecule can be completely the same as Compound (A) as referred to above, that is, the epoxy compound having more than one epoxy groups on the average in the molecule, and various compounds known in the art, such as those illustrated above, can be mentioned. The amount of the inventive curing agent for epoxy resin to be used (incorporated) in the inventive resin composition is preferably 0.3 to 50 parts by weight relative to 100 parts by weight of the epoxy compound (x). An amount of less than 0.3 part by weight cannot provide sufficient curable properties to the resulting resin composition, while an amount of more than 50 parts by weight may reduce the performance of the cured product. Further, other additives can be added, if necessary or desired, to the curable epoxy resin composition of the present invention. Such additives include, e.g., (z) fillers such as alumina, silica, aerozil, calcium carbonate, aluminum hydroxide, magnesium hydroxide, talc, bentonite, barium sulfate, and the like (inorganic fillers), and fluidity regulators such as acryl oligomers, silicone etc., surface modifiers, diluents, and flame-retardants.

Hereinafter, the above-mentioned econd invention will be described.

Compound (a) for the inventive latent curing agent for epoxy resin, that is, an alicyclic epoxy compound having 2 or more epoxy groups in the molecule, includes those epoxy compounds having 2 or more epoxy groups on the average in the molecule that are bound directly to the carbon atom(s) forming the alicyclic hydrocarbon ring and/or that are on the alicyclic hydrocarbon ring.

For example, mention can be made of those epoxy compounds having 2 or more epoxy groups in the molecule represented by the general formula (1) or (2) below.

(1)

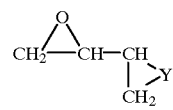

(2)

wherein Y represents a $C_2$ to $C_8$ monocyclic, polycyclic or bridged hydrocarbon ring which may have substituent group(s).

Specific examples thereof include, e.g., those epoxy compounds-represented by the formulae (i) to (vii) below.

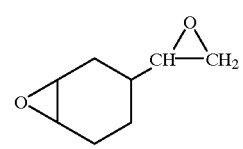

(i)

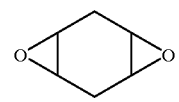

(ii)

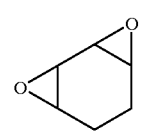

(iii)

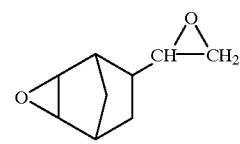

(iv)

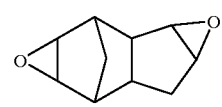

(v)

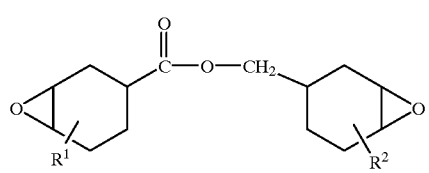

(vi)

wherein $R^1$ and $R^2$ represent independently a hydrogen atom, a methyl group or an ethyl group.

(vii)

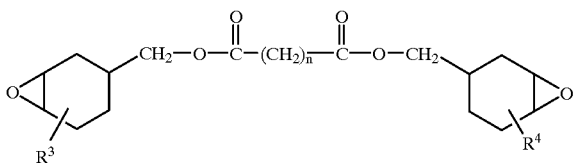

wherein $R^3$ and $R^4$ represent independently a hydrogen atom, a methyl group or an ethyl group, and n is an integer of 2 to 10.

Among these epoxy compounds, those alicyclic epoxy compounds represented by the formulae (vi) and (vii) are particularly preferable because of their high boiling point, and those alicyclic epoxy compounds represented by the formula (vi) are more preferable because of their low viscosity.

As an alicyclic epoxy compound represented by the formula (vi) above, "Celoxide 2021" produced by Daicel Chemical Industries, Ltd. (in the formula (vi), $R^1$ and $R^2$ are both a hydrogen atom) is commercially available, and as an alicyclic epoxy compound represented by the formula (vii), "ERL-4299" produced by Union Carbide (in the formula (vii), $R^3$ and $R^4$ are both a hydrogen atoms, and n=4) or the like is commercially available.

The alicyclic epoxy compounds described above may be used each alone or in combination of two or more thereof.

A hydrolyzable halogen group contained in an epoxy resin is a critical factor worsening electrical reliability, so in epoxy resin compositions used in the electronics field, particularly in producing semiconductor parts, its concentration should be made as low as possible. In conventional latent curing agents, glycidyl compounds have been generally used as epoxy compounds, but the glycidyl compounds usually contain hydrolyzable halogen groups in the order of 1000 ppm (weight) and can thus not be said to be preferable in respect of electrical reliability in the field of electronics. Further, the hydrolyzable halogen groups can also be reduced by refining, but it is difficult to attain high purity, and if refining is conducted, there are the problems of an increased number of steps, higher costs, etc. The alicyclic epoxy compounds do inherently not contain hydrolyzable halogen groups, and are free from the problems described above, thus enable a significant reduction of the hydrolyzable halogen groups in the latent curing agent.

Compound (b) for the inventive latent curing agent for epoxy resin, that is, a compound having in the molecule both a tertiary amino group and at least one functional group selected from the group consisting of OH group, SE group, NH group, $NH_2$ group, COOH group and $CONHNH_2$ group is represented by, e.g., the general formula (3) below. Incidentally, the general formula (3) corresponds to the general formula (8) previously described in connection with the first invention.

(3)

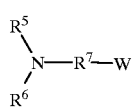

wherein W represents an OH group, SH group, NH group, $NH_2$ group, COOH group or $CONHNH_2$ group, $R^5$ and $R^6$ represent independently a $C_1$ to $C_{20}$ alkyl group, a $C_2$ to $C_{20}$ alkenyl group, an aralkyl group such as benzyl group, or one of the above groups wherein some carbon atom(s) in the carbon chain are replaced by other atom(s) (e.g., oxygen) or some hydrogen atom(s) on the carbon chain are replaced by a halogen, a functional group represented by W defined above or the like, and $R^7$ is a similar to $R^5$ and $R^6$ defined above but divalent residue. Furthermore, $R^5$ and $R^6$ or $R^5$, $R^6$ and $R^7$ may be bound to one another to form a ring.

As Compound (b), those compounds containing a tertiary amino group in the heterocyclic ring represented by the following general formula (4), (5) or (7) can also be mentioned as effective compounds. Incidentally, the general formulae (4), (5) and (7) correspond, respectively, to the general formulae (9), (10) and (12) described above in connection with the first invention.

(4)

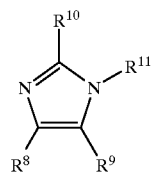

wherein $R^8$, $R^9$, $R^{10}$ and $R^{11}$ represent independently a hydrogen atom, one of the same groups as $R^5$ and $R^6$ defined in the general formula (3) above, an aryl group which may be substituted with an alkyl or aryl group, or a functional group represented by W in the general formula (3) above, and at least one of $R^8$, $R^9$, $R^{10}$ and $R^{11}$ represents a functional group represented by W or a group containing a functional group represented by W except the case where $R^{11}$ is a hydrogen atom. Even in the case where $R^{11}$ is a hydrogen atom, $R^8$, $R^9$ and $R^{10}$ can be a functional group represented by W or a group containing a functional group represented by W.

(5)

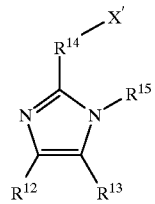

wherein $R^{12}$, $R^{13}$ and $R^{15}$ represent independently a hydrogen atom, one of the same group as $R^5$ and $R^6$ defined in the general formula (3) above, or an aryl group which may be substituted with an alkyl or aryl group, $R^{14}$ is a similar to $R^5$ and $R^6$ in the general formula (3) above, but divalent residue, or an arylene group which may be substituted with an alkyl or aryl group, and X' is a hydrogen or a group represented by the following general formula (6):

(6)

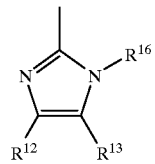

wherein $R^{12}$ and $R^{13}$ have the same meanings as in the general formula (5) above, and $R^{16}$ is a hydrogen atom, one of the same group as $R^5$ and $R^6$ defined in the general formula (3) above, or an aryl group which may be substituted with an alkyl or aryl group, and in the case where none of $R^{15}$ and $R^{16}$ are a hydrogen atom, at least one of $R^{12}$, $R^{13}$, $R^{14}$, $R^{15}$ and $R^{16}$ represents a functional group represented by W or a group containing a functional group represented by W. Even in the case where $R^{15}$ and/or $R^{16}$ is a hydrogen atom, $R^{12}$, $R^{13}$, $R^{14}$, $R^{15}$ and $R^{16}$ can be a functional group represented by W or a group containing a functional group represented by W. Incidentally, the general formula (6) above, corresponds to the general formula (11) described above in connection with the first invention.

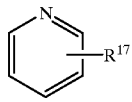

(7)

wherein $R^{17}$ is a functional group represented by W, or a similar group to $R^5$ or $R^6$ but containing a functional group represented by W.

Specific examples of Compound (b) can be the same as those of Compound (B) described earlier in connection with the first invention.

As Compound (b) are preferable compounds having both a tertiary amino group and at least one functional group selected from the group consisting of OH group, NH group and $NH_2$ group, which is all the same as with Compound (B). And specific examples and more preferable examples of such compounds are all the same as with Compound (B).

Compound (b) as described above can be used each singly or in combination of two or more thereof.

Compound (c) as one of the starting materials for the synthetic reaction of the inventive latent curing agent for epoxy resin, that is, a compound having in the molecule at least one functional group selected from the group consisting of $NH_2$ group and $CONHNH_2$ group, or in the molecule at least 2 functional groups selected from the group consisting of OH group, SE group, NH group and COOH group (provided that those compounds having an epoxy group or a tertiary amino group in the molecule are excluded), includes, e.g., amine compounds such as piperazine, aniline and cyclohexyl amine; polybasic carboxylic acids such as adipic acid, phthalic acid, 3,9-bis(2-carboxyethyl)-2,4,8,10-tetraoxaspiro [5,5] undecane; polyvalent thiols such as 1,2-dimercaptoethane and 2-mercaptoethyl ether; hydrazide compounds such as phenyl acetic acid hydrazide; amino acids such as alanine and valine; compounds having 2 kinds or more of functional groups, such as 2-mercaptoethanol, 1-mercapto-3-phenoxy-2-propanol, mercaptoacetic acid, N-methyl ethanol amine, diethanol amine, hydroxyaniline, N-methyl-o-aminobenzoic acid, anthranilic acid, sarcosine, hydroxybenzoic acid and lactic acid; polyhydric alcohols such as pentaerythritol, sorbitol, trimethylolpropane, trimethylolethane and tris(hydroxyethyl) isocyanurate; and polyhydric phenols. These compounds are all the same as with Compound (C).

Compound (c) is particularly preferably a polyhydric phenol compound, and examples thereof can be bisphenol A, bisphenol F, bisphenols, hydroquinone, catechol, resorcinol, pyrogallol, phenol novolak resin and resol resin, which is all the same as with Compound (C).

Compounds (c) described above may be used each singly or can be used in combination of two or more thereof, to react with Compounds (a) and (b).

It is not preferable that none of Compounds (b) and (c) contain any of OH group, SH group, COOH group and $CONHNH_2$ group, because the reactivity between the alicyclic epoxy compounds and these compounds is significantly worsened. Further, Compounds (b) and (c), unlike glycidyl compounds, do inherently not contain hydrolyzable halogen groups.

To produce the inventive latent curing agent for epoxy resin, Compounds (a), (b) and (c) and optionally, Compound (d), a glycidyl compound having 2 or more epoxy groups in the molecule can be allowed to react on one another. In this case, the reaction temperature and reaction time can be reduced in producing the inventive latent curing agent for epoxy resin, and there is, in turn, an advantage from the viewpoint of productivity of the latent curing agent for epoxy resin. However, the addition or use of the glycidyl compounds, as described above, causes an increase in hydrolyzable halogen atoms in the latent curing agent, resulting in a reduction in the effects of the present invention, so whether they are used or not, or what amount is to be used, shall be determined suitably in consideration of the desired use, standards, total costs, etc. For example, if the inventive latent curing agent for epoxy resin is to be used in conducting composites, the amount of glycidyl compounds to be used or added is preferably not more than 30% by weight relative to the total amount of Compound (a).

If the glycidyl compounds are to he used or added, those with hydrolyzable halogen groups reduced by refining may be used, but the use or addition thereof may result in the increase of production costs, so whether they are added or not shall be suitably determined depending on the given circumstances.

The above Compound (d), that is, the glycidyl compound having 2 or more epoxy groups in the molecular, includes polyglycidyl ether compounds, polyglycidyl ester compounds, polyglycidyl amine compounds, glycidyl ether ester compounds, and compounds having glycidyl ester group(s) and alicyclic epoxy group(s) in the molecule as shown by the formula (8).

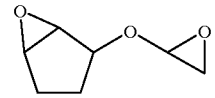

(8)

The polyglycidyl ether compounds described above include, e.g., glycidyl ether compounds obtainable by reacting an epihalohydrin with a polyhydric phenol compound such as bisphenol A, bisphenol F, bisphenol S, catechol, resorcinol, phenol novolak resin or resol resin, or with a polyhydric alcohol compound such as a compound obtainable by subjecting glycerin, polyethylene glycol, or polyhydric phenol compound to addition reaction with an alkylene oxide containing 2 to 4 carbon atoms.

As the polyglycidyl ester compounds described above, mention can be made of glycidyl ester compounds obtainable by allowing an aliphatic polycarboxylic acid such as adipic acid, sebacic acid or the like, or an aromatic polycarboxylic acid such as phthalic acid, terephthalic acid or the like, to react on an epihalohydrin.

As the above polyglycidyl amine compounds, mention can be made of glycidylamine compounds, etc. obtainable by reacting, e.g., 4,4'-diaminodiphenyl methane, aniline, m-aminophenol or the like, with an epihalohydrin.

As the above glycidyl ether ester compounds, mention can be made of, e.g., glycidyl ether ester compounds obtainable by allowing a hydroxycarboxylic acid such as p-oxybenzoic acid, β-oxynaphthoic acid or the like, to react with an epihalohydrin.

Epihalohydrin referred to herein includes, e.g., epichlorohydrin, epibromohydrin, 1,2-epoxy-2-methyl-3-chloropropane, 1,2-epoxy-2-ethyl-3-chloropropane, etc.

Among the glycidyl compounds described above, the glycidyl ether compounds, glycidyl ester compounds and glycidyl ether ester compounds are preferable, among which the glycidyl ether compounds are particularly preferable.

The glycidyl compounds mentioned above may be used each singly or can be used in combination of the 2 kinds or more thereof.

In the production of the inventive latent curing agent for epoxy resin, when Compound (b) is a compound having in the molecule a tertiary amino groupand at least one functional group selected from the group consisting of OH group, SH group, COOH group and $CONHNH_2$ group, the ratio of the respective compounds is a ratio of 0.5 to 2.5 equivalents, preferably 0.6 to 1.5 equivalents of the epoxy groups in Compound (a) (or in both Compounds (a) and (d)) per 1 equivalent of all of the OH group, SH group, COOH and $CONHNH_2$ group in Compounds (b) and (c) (provided that with respect to the $CONHNH_2$ group, a number obtained by doubling the number of moles of the $CONHNH_2$ group is assumed to be the equivalent of the $CONHNH_2$ group because the $CONHNH_2$ group is a di-functional group toward the epoxy compound), and Compound (c) is used preferably in twice the amount in terms of moles of Compound (b). If the epoxy group in Compound (a) (or in both Compounds (a) and (d)) is less than 0.5 equivalent, sufficient storage stability cannot be obtained upon incorporation of the reaction product as the latent curing agent into an epoxy compound, whereas given 2.5 equivalents or more, the softening temperature of the reaction product gets too high and upon incorporation thereof as the latent curing agent into an epoxy compound, sufficient rapid curing properties cannot be exhibited while the resulting cured product becomes heterogeneous. If Compound (c) exceeds twice the moles of Compound (b), curing properties are worsened.

When Compound (b) is a compound having in the molecule a tertiary amino group and at least one functional group selected from the group consisting of NH group and $NH_2$ group, the ratio of the respective compounds is a ratio of 0.2 to 1.1 equivalents of the epoxy group in Compound (a) (or in both Compounds (a) and (d)) per 1 equivalent of all of the OH group, SH group, COOH, $CONHNH_2$ group, NH group and $NH_2$ group in Compounds (b) and (c) (provided that with respect to the $CONHNH_2$ group and $NH_2$ group, a number obtained by doubling the number of moles of the $CONHNH_2$ group or $NH_2$ group is assumed to be the equivalent of the $CONHNH_2$ group or $NH_2$ group because these groups are di-functional groups toward the epoxy compound). If the epoxy group in Compound (a) (or in both Compounds (a) and (d)) is less than 0.2 equivalent, sufficient storage stability cannot be obtained upon incorporation of the reaction product as the latent curing agent into an epoxy compound, whereas given 1.1 equivalents or more, the softening temperature of the reaction product gets too high and upon incorporation thereof as the latent curing agent into an epoxy compound, sufficient rapid curing properties cannot be exhibited while the resulting cured product becomes heterogeneous.

The inventive latent curing agent for epoxy resin can be obtained, e.g., by sufficiently mixing Compounds (a), (b) and (c) (or Compounds (a), (b), (c) and (d)), gelatinizing the mixture at room temperature, then completing the reaction at a temperature of 80 to 150° C., then solidifying by cooling, and grinding the solidified mixture. This reaction may be conducted in a solvent such as toluene, tetrahydrofuran, methyl ethyl ketone, dimethylformamide or the like, followed by removal of the solvent, solidification and grinding.

The inventive latent curing agent for epoxy resin can be obtained as the addition products having arbitrary softening temperatures by changing the type and mixing ratio of Compounds (a), (b) and (c) (or (a), (b), (c) and (d)), and those having softening temperatures of 60 to 180° C. are more preferable. If the latent curing agent with a softening temperature of less than 60° C. is incorporated into an epoxy compound, the resulting epoxy composition is poor in storage stability at room temperature while the latent curing agent with a softening temperature of more than 180° C. does not bring about sufficient curing property.

In producing the inventive latent curing agent for epoxy resin, monoepoxy compounds,besides Compounds (a), (b), (c) and (d) may accompany in the range in which the effects of the present invention are not inhibited. Such monoepoxy compounds include, e.g., monoepoxy compounds such as butyl glycidyl ether, phenyl glycidyl ether, p-tert-butyl phenyl glycidyl ether, sec-butyl phenyl glycidyl ether, glycidyl methacrylate, etc.

The latent curing agent for epoxy resin of the present invention can also be used in combination with curing agents known in the art, such as acid anhydrides, dicyandiamide, hydrazide compounds, guanamines, melamines, etc.

The respective compounds as the starting materials for the inventive latent curing agent for epoxy resin, some of which have been described above, may be refined suitably in conventional processes such as distillation, recrystallization, etc.

The inventive latent curing agent for epoxy resin is rapidly curing or has rapidly curing function at low temperatures and does not require high temperatures for adhesion, thus reducing thermal stress on electronics parts such as electronic elements, liquid-crystal panels, etc., to which the latent curing agent when incorporated into an epoxy compound has been applied, whereby the reduction and deterioration of connection precision can be reduced. Further, it is rapidly curing at low temperatures and simultaneously, has the following excellent characteristics as compared with conventional amine adduct-type latent curing agents: (1) it is also excellent in electrical reliability due to a low concentration of hydrolyzable halogen groups therein; (2) it raises the glass transition point of the resulting resin to improve the thermostability of the cured product; and (3) when used in conducting composites, it improves the electrical conductivity of the cured product.

The inventive latent curing agent (y') for epoxy resin can be uniformly mixed with an epoxy compound (x') having 2 or more epoxy groups in the molecule, whereby the curable epoxy resin composition of the present invention is easily formed.

In the curable epoxy resin composition of the present invention, the epoxy compound (x') having 2 or more epoxy groups in the molecule includes a wide variety of epoxy compounds such as alicyclic epoxy compounds used as Compound (a) or glycidyl compounds used as Compound (d). In the field of electronics, glycidyl compounds with hydrolyzable halogen groups reduced by refining are used, and the inventive latent curing agent for epoxy resin can also be formed into a curable epoxy resin composition having a low content of hydrolyzable halogen groups, which is more-suitable for use in electronics.

The amount of the inventive. latent curing agent (y') for epoxy resin to be incorporated in the inventive curable epoxy resin composition is preferably 0.3 to 50 parts by weight per 100 parts by weight of the epoxy compound (x') having 2 or more epoxy groups in the molecule. In an amount of less than 0.3 part by weight, sufficient curing properties cannot be attained, while in an amount of more than 50 parts by weight, the performance of the resulting cured product may be worsened.

By further adding inorganic filler(s) (z') to the curable epoxy resin composition consisting of the components (y') and (x') described above, it is possible to form the curable epoxy resin composition to be used as, e.g., resin composition for conducting composites, anisotropic conductive films, encapsulants for semiconductor, or the like.

To use the inventive resin composition as a resin composition for conductive resin composites or anisotropic conductive films, the inorganic fillers include conductive fillers, that is, metal powder such as gold, silver, copper, palladium, nickel, etc., as well as carbon black, graphite, etc. Further, it is also possible to use composite fillers wherein metal powder such as iron, copper, nickel, etc. or carbon black, silica powder, organic resin powder such as polystyrene, is surface-coated with an electrically conductive material such as gold, silver, or the like. Such fillers may be in the form of granules, flakes, dendrites or the like, as is necessary. Usually, silver powder is often used from the viewpoint of costs and electrical conductance.

To use the inventive resin composition as encapsulant resin for semiconductor, the inorganic fillers include powders of alumina, silica, calcium carbonate, aluminum hydroxide, in magnesium hydroxide, talc, bentonite, barium sulfate, aerozil, etc. In particular, silica such as crystalline silica, fused silica, or the like, is frequently used.

To use the inventive resin composition as, e.g., resin composition for conducting composites, the amount of inorganic fillers to be incorporated is 10 to 55 volumes per 100 volumes of the inventive resin composition. In an amount of less than 10 volumes, sufficient electrical conductance cannot be achieved, while in an amount of more than 55 volumes, the viscosity of the resin composition gets too viscous to be practical. A preferable amount is 15 to 55 volumes. To use the inventive resin composition as resin composition for anisotropic conductive films, the amount of inorganic fillers to be incorporated is 0.1 to 25 volumes per 100 volumes of the film and more preferably 0.1 to 10 volumes to prevent an excess of the electrically conductive inorganic fillers from forming a short circuit. Further, for use thereof as encapsulant resin for semiconductor, the amount of inorganic fillers is 40 to 90 parts by weight per 100 parts by weight of the resin excluding the fillers.

Besides the inorganic fillers described above, organic fillers usually incorporated into curable epoxy resin composition can also be incorporated within the range in which the effects of the present invention are not inhibited. Such organic fillers include fine nylon particles, fine polystyrene particles, fine polyethylene particles, cross-linked fine rubber particles, fine acrylic core-shell particles, fine rubber-based core-shell particles, fine silicone particles, and fine ethylene-acrylate copolymer particles.

The curable epoxy resin composition of the present invention can contain other additives as necessary within the range in which the effects of the present invention are not inhibited. Such additives include, e.g., fluidity regulators such as acrylic oligomer, silicone, etc., as well as surface modifiers, coloring agents, releasing agents, surface active agents, coupling agents, diluents, flame-retardants, silicon oil, rubber, etc.

EXAMPLES

Hereinafter, the present invention will be described in more detail by reference to Production Examples and Examples, which however are not intended to limit the present invention.

First, Examples of the first invention will be described. The abbreviations for the starting materials used in Production Examples and Examples are as follows:

(A) Epoxy compounds having more than one epoxy groups on the average in the molecule:

EP#828: "Epicoat #828" (bisphenol A type epoxy resin (epoxy equivalent, 184 to 194) produced by Yuka Shell Epoxy K. K.), EP#834: "Epicoat #834" (bisphenol A type epoxy resin (epoxy equivalent, 230 to 270) produced by Yuka Shell Epoxy K. K.), EP#1001: "Epicoat #1001" (bisphenol A type epoxy resin (epoxy equivalent, 450 to 500) produced by Yuka Shell Epoxy K. K.), EP#807: "Epicoat #807" (bisphenol F type epoxy resin (epoxy equivalent, 160 to 175) produced by Yuka Shell Epoxy K. K.).

(B) Compounds having, in the molecule, both a tertiary amino group and at least 1 functional group selected from the group consisting of OH group, SH group, NH group, $NH_2$ group, COOH group and $CONHNH_2$ group;

DEAPA: diethylaminopropylamine (water content, 0.16 wt %),

DEAE-OH: diethyl aminohexanol (water content, 0.18 wt %),

2PZL: 2-phenyl imidazoline (water content, 0.07 wt %),

2E4MZ: 2-ethyl-4-methyl imidazole (water content, 0.30 wt %),

2MZ: 2- methyl imidazole (water content, 0.06 wt %),

PG-MZ: 1-(2-hydroxy-3phenoxypropyl)-2-methyl imidazole (water content, 0.04 wt %), PG-EMZ: 1-(2-hydroxy-3-phenoxypropyl)-2-methyl-4-methyl imidazole (water content, 0.28 wt %), PG-PZL: 1-(2-hydroxy-3-phenoxypropyl)-2-phenyl imidazoline (water content, 0.04 wt %), DMP-10: 2-(dimethylaminomethy) phenol (water content, 0.42 wt %), DMP-30: 2,4,6-tris (dimethylaminomethyl) phenol (water content, 0.09 wt %), SMZ: 2-mercapto-1-methyl imidazole (water content, 0.18 wt %), DMGH: N,N-dimeathyl glycinehydrazide (water content, 0.34 wt %), NA: nicotinict acid (water content, 0.31 wt %).

(C) Compounds having in the molecule at least one functional group selected from the group consisting of $NH_2$ group and $CONHNH_2$ grope or in the molecule at least 2 functional groups selected from the group consisting of OH group, SH group, NH group, $NH_2$ group, COOH group and $CONHNH_2$ group (provided that those compounds having epoxy group(s) or tertiary amino group(s) are excluded);

BA: bisphenol A (water content, 0.27 wt %),

PNV: phenol novolak "Shonol BRG-555" (hydroxyl group equivalent, 103; water content, 0.57 wt %, a product of Showa Highpolymer Co., Ltd.), PIP: anhydrous piperazine (water content, 0.39 wt %), PAAH: phenyl acetic acid hydrazide (water content, 0.22 wt %), AL: aniline (water content, 0.14 wt %), HQ: hydroquinone (water content, 0.25 wt %), DEA: diethanolamine (water content, 0.09 wt %).

Production Example 1
(Production of an Addition Product of DEAE-OH and "Epicoat #828")

110.3 g (0.584 equivalents) of "Epicoat #828", 39.1 g (0.334 equivalents) of DEAE-OH and 10.5 g (0.583 equivalents) of water were placed in a beaker and stirred vigorously at room temperature during which the temperature was gradually raised. The reaction proceeded rapidly exothermically at about 70° C., and thereafter the reaction was allowed to proceed for 1 hour in such that the reaction mixture was maintained at about 110° C. by cooling or heating. After the reaction, the reaction mixture was cooled to room temperature to give a pale yellow solid. This addition product was roughly ground and then finely ground to give a powder of about 10 μm in the average diameter. This will be referred to as Latent curing agent for epoxy resin Sample No. 1.

Production Example 2
(Production of an Addition Product of PG-MZ, DMP-30, BA and "Epicoat #828")

A three-necked 3,000 ml flask equipped with a reflux condenser and a stirrer was charged with 116.1 g (0.5 equivalents) of PG-MZ, 26.,6 g (0.1 equivalent) of DMP-30 and 57.1 g (0.5 equivalents) of BA, 1.8 g (0.1 equivalent) of water and 500 ml of methyl ethyl ketone as the solvent. Then, 189 g (1.0 equivalent) of "Epicoat #828" dissolved in 300 ml methyl ethyl ketone was added dropwise(about 3 hours) to the mixture under heating and stirring. After this addition, the mixture was further heated under reflux for 2 hours with stirring. Thereafter, the methyl ethyl ketone as the solvent was distilled off under reduced pressure, and the residue was cooled to room temperature to give a pale yellow solid. This addition product was roughly ground and then finely ground to give a powder of about 10 μm in the average diameter. This will be referred to as Latent curing agent for epoxy resin Sample No. 22.

The sample number of the inventive curing agents for epoxy resin synthesized according to Production Example No. 1 or 2, as well as the composition of the starting materials thereof, are shown in Table 1 below.

TABLE 1

| Sample No. | Ingredient (a) (*1) | | Ingredient (b) (*2) | | Ingredient (c) (*3) | | a/(b + c) (equivalent ratio) | Amount of water added (*4) | Water content (*5) |
|---|---|---|---|---|---|---|---|---|---|
| 1 | EP#828 | (1.75) | DEAE-OH | (1.0) | — | | 1.75 | 1.0 | 1.0130 |
| 2 | EP#828 | (1.8) | DEAPA | (2.0) | — | | 0.90 | 1.0 | 1.0127 |
| 3 | EP#828 | (2.0) | DMP-30 | (1.0) | — | | 2.00 | 1.0 | 1.0129 |
| 4 | EP#828 | (1.1) | 2E4MZ | (1.0) | — | | 1.10 | 1.0 | 1.0230 |
| 5 | EP#828 | (1.1) | 2PZL | (1.0) | — | | 1.10 | 1.0 | 1.0115 |
| 6 | EP#828 | (1.4) | PG-MZ | (1.0) | — | | 1.40 | 1.0 | 1.0100 |
| 7 | EP#828 | (1.3) | NA | (1.0) | — | | 1.30 | 1.0 | 1.0226 |
| 8 | EP#828 | (1.3) | DMGH | (1.0) | — | | 1.30 | 1.0 | 1.0148 |
| 9 | EP#828 | (1.3) | SMZ | (1.0) | — | | 1.30 | 1.0 | 1.0151 |
| 10 | EP#834 | (1.5) | PG-PZL | (1.0) | — | | 1.50 | 1.0 | 1.0127 |
| 11 | EP#828 | (1.5) | DEAPA | (1.0) | BA | (1.0) | 0.75 | 1.0 | 1.0216 |
| 12 | EP#828 | (2.0) | DMP-30 | (1.0) | BA | (1.0) | 1.00 | 1.0 | 1.0215 |
| 13 | EP#828 | (2.0) | PG-EMZ | (1.0) | BA | (1.0) | 1.00 | 1.0 | 1.0352 |
| 14 | EP#828 | (1.8) | 2E4MZ | (1.0) | PNV | (1.0) | 0.90 | 1.0 | 1.0346 |
| 15 | EP#828 | (1.8) | PG-PZL | (1.0) | PNV | (1.0) | 0.90 | 1.0 | 1.0281 |
| 16 | EP#828 | (2.0) | DMP-10 | (1.0) | PIP | (1.0) | 1.00 | 1.0 | 1.0286 |
| 17 | EP#828 | (2.0) | DMP-30 | (1.0) | PAAH | (1.0) | 1.00 | 1.0 | 1.0129 |
| 18 | EP#828 | (2.0) | DMP-30 | (1.0) | AL | (1.0) | 1.00 | 1.0 | 1.0129 |
| 19 | EP#828 | (2.0) | DMP-30 | (1.0) | PIP | (0.5) | 1.00 | 1.0 | 1.0195 |
|  |  |  |  |  | BA | (0.5) |  |  |  |
| 20 | EP#828 | (2.0) | DMP-30 | (1.0) | DEA | (1.0) | 1.00 | 1.0 | 1.0129 |
| 21 | EP#828 | (2.0) | SMZ DMP-10 | (1.0) (0.2) | BA | (1.0) | 0.91 | 1.0 | 1.0241 |
| 22 | EP#828 | (2.0) | PG-MZ DMP-30 | (1.0) (0.2) | BA | (1.0) | 0.91 | 0.1 | 1.0188 |
| 23 | EP#828 | (2.0) | PG-MZ | (1.5) | BA | (1.5) | 0.63 | 1.0 | 1.0243 |
| 24 | EP#828 | (2.5) | DMP-30 PG-MZ DMP-30 | (0.2) (1.0) (0.5) | BA | (1.5) | 0.83 | 1.0 | 1.0213 |
| 25 | EP#828 | (2.0) | DMP-10 | (1.0) | ADP | (1.0) | 1 | 1.0 | 1.0296 |
| 26 | EP#828 | (2.0) | PG-MZ | (1.0) | DME | (1.0) | 1 | 1.0 | 1.0133 |
| 27 | EP#828 | (2.5) | DEAPA DMP-30 | (3.5) (0.5) | BA | (1.5) | 0.45 | 1.0 | 1.0273 |
| 28 | EP#828 | (1.5) | 2MZ DMP-30 | (1.0) (0.2) | BA | (1.0) | 0.68 | 1.0 | 1.0213 |
| 29 | EP#834 | (2.0) | PG-MZ DMP-30 | (1.0) (0.2) | BA | (1.0) | 0.91 | 1.0 | 1.0208 |
| 30 | EP#828 | (2.0) | PG-EMZ DMP-30 | (1.0) (0.2) | HQ | (1.0) | 0.91 | 1.0 | 1.0318 |
| 31 | EP#1001 | (2.0) | DEAE-OH DMP-30 | (1.0) (0.2) | BA | (1.0) | 0.91 | 1.0 | 1.0369 |
| 32 | EP#828 | (2.0) | PG-PZL DMP-30 | (1.0) (0.1) | BA | (1.0) | 0.95 | 1.0 | 1.0188 |
| 33 | EP#807 | (1.5) | PG-MZ DMP-30 | (1.0) (0.2) | PNV | (1.0) | 0.68 | 1.0 | 1.0316 |

TABLE 1-continued

| Sample No. | Ingredient (a) (*1) | Ingredient (b) (*2) | Ingredient (c) (*3) | a/(b + c) (equivalent ratio) | Amount of water added (*4) | Water content (*5) |
|---|---|---|---|---|---|---|
| 34 | EP#828 (3.0) | DEAPA (5.0) DMP-30 (0.5) | PNV (3.0) | 0.35 | 1.0 | 1.0498 |

*1: Parenthesized numerics indicate equivalent number of epoxy group.
*2: Parenthesized numerics indicate equivalent number of active hydrogen.
*3: Parenthesized numerics indicate equivalent number of active hydrogen.
*4: Parenthesized numerics indicate equivalents per 1 equivalent of epoxy group.
*5: Parenthesized numerics indicate equivalents per 1 equivalent of epoxy group.

Comparative Production Example 1

A pale yellow solid was obtained in the same manner as in Production Example 1 except that no water was added. It was roughly ground and then finely ground to give a powder of about 10 μm in the average diameter. This will be referred to as Comparative Sample No. 1.

Comparative Production Example 2

A three-necked 3,000 ml flask equipped with a reflux condenser and a stirrer was charged with 174.2 g (0.75 equivalents) of PG-MZ, 26.6 g (0.1 equivalent) of DMP-30 and 85.7 g (0.75 equivalents) of BA and 500 ml of methyl ethyl ketone as the solvent. Then, 189 g (1.0 equivalent) of "Epicoat #828" dissolved in 300 ml of methyl ethyl ketone was added dropwise(about 3 hours) to the mixture under heating and stirring. After this addition, the mixture was further heated under reflux for 2 hours with stirring. Thereafter, the methyl ethyl ketone as the solvent was distilled off under reduced pressure, and the residue was cooled to room temperature to give a pale yellow solid. This addition product was roughly ground and then finely ground to give a powder of about 10 μm in the average diameter. This will be referred to as Comparative Example No. 4.

The number of the comparative samples produced according to Comparative Production Example 1 or 2, as well as the composition of the starting materials thereof, are shown in Table 2 below.

stability of the thus prepared compositions were measured to evaluate their performance.

TABLE 3

| Epicoat #807 | 100 wt. parts |
| Inventive latent curing agent or Curing agent of Comparative Production Example | 20 wt. parts |
| "Aerozil #200" ex Japan Aerozil Co., Ltd. | 1 wt part |

Method of Preparing the Curable Epoxy Resin Compositions:

The respective ingredients at the ratio shown in Table 3 above were mixed and defoamed for 30 minutes under reduced pressure in a vacuum mixing-grinding machine (Ishikawa Kojyo K. K.).

Gel Time:

Determined using about 2.5 g of each curable epoxy resin composition at a predetermined temperature by means of a Yasuda-type gel timer (ex Yasuda Seiki Seisakusho K. K.).

Storage Stability:

Each curable epoxy resin composition was placed in a sealed vessel, then stored in a thermostat at a predetermined temperature (40° C.) and the number of days until its fluidity was lost was determined.

The obtained results are shown in Table 4 below for Examples and in Table 5 below for Comparative Examples.

TABLE 2

| Sample No. | Ingredient (a) (*1) | Ingredient (b) (*2) | Ingredient (c) (*3) | a/(b + c) (equivalent ratio) | Water content (*5) |
|---|---|---|---|---|---|
| Comparative 1 | EP#828 (1.75) | DEAE-OH (1.0) | — | 1.75 | 0.0130 |
| Comparative 2 | EP#828 (1.5) | DEAPA (1.0) | BA (1.0) | 0.75 | 0.0216 |
| Comparative 3 | EP#828 (2.0) | DMP-30 (1.0) | DEA (1.0) | 1.00 | 0.0129 |
| Comparative 4 | EP#828 (2.0) | PG-MZ (1.5) DMP-30 (0.2) | BA (1.5) | 0.63 | 0.0243 |
| Comparative 5 | EP#828 (2.5) | DEAPA (3.5) DMP-30 (0.5) | BA (1.5) | 0.45 | 0.0273 |

*1, *2, *3 and *5 mean the same meanings, respectively, as those indicated in the footnote to Table 1.

Examples 1 to 34 and Comparative Examples 1 to 5

Each of the above latent curing agents for epoxy resin was added to an epoxy compound at the ratio shown in Table 3 below and the mass was mixed to give a curable epoxy resin composition. The curable properties (gel time) and storage

TABLE 4

| Sample No. | Curability (Gel time) Temperature | Time | Storage stability (40° C.) |
|---|---|---|---|
| 1 | 150° C. | 20 min. | more than 3 months |
| 2 | 120° C. | 10 min. | 3 weeks |
| 3 | 150° C. | 10 min. | more than 3 months |
| 4 | 120° C. | 5 min. | 3 weeks |
| 5 | 120° C. | 5 min. | 3 weeks |
| 6 | 120° C. | 7 min. | 1 month |
| 7 | 150° C. | 10 min. | more than 3 months |
| 8 | 150° C. | 23 min. | more than 3 months |
| 9 | 150° C. | 5 min. | 3 weeks |
| 10 | 120° C. | 7 min. | 1 month |
| 11 | 120° C. | 15 min. | 2 months |
| 12 | 120° C. | 10 min. | more than 3 months |
| 13 | 100° C. | 9 min. | 2 months |
| 14 | 120° C. | 8 min. | 2 months |
| 15 | 120° C. | 10 min. | 2 months |
| 16 | 100° C. | 5 min. | more than 3 months |
| 17 | 100° C. | 6 min. | more than 3 months |
| 18 | 100° C. | 7 min. | more than 3 months |
| 19 | 100° C. | 5 min. | more than 3 months |
| 20 | 100° C. | 5 min. | 1 month |
| 21 | 100° C. | 6 min. | 1 month |
| 22 | 100° C. | 4 min. | 2 months |
| 23 | 100° C. | 4 min. | more than 3 months |
| 24 | 100° C. | 5 min. | more than 3 months |
| 25 | 100° C. | 8 min. | 3 weeks |
| 26 | 100° C. | 8 min. | 3 weeks |
| 27 | 100° C. | 8 min. | more than 3 months |
| 28 | 100° C. | 5 min. | more than 3 months |
| 29 | 100° C. | 8 min. | more than 3 months |
| 30 | 100° C. | 6 min. | more than 3 months |
| 31 | 150° C. | 3 min. | more than 3 months |
| 32 | 100° C. | 12 min. | more than 3 months |
| 33 | 100° C. | 6 min. | more than 3 months |
| 34 | 100° C. | 5 min. | 3 weeks |

TABLE 5

| Sample No. | Curability (Gel time) Temperature | Time | Storage stability (40° C.) |
|---|---|---|---|
| Comparative 1 | 150° C. | 20 min. | 3 weeks |
| Comparative 2 | 120° C. | 15 min. | 3 weeks |
| Comparative 3 | 100° C. | 5 min. | 5 days |
| Comparative 4 | 100° C. | 4 min. | 2 weeks |
| Comparative 5 | 100° C. | 12 min. | 2 weeks |

Examples 35 to 36 and Comparative Examples 6 to 7

To examine the performance of the inventive latent curing agent for epoxy resin when used in combination with other latent curing agents, curing epoxy resin compositions were -formulated at the ratio shown in Table 6 below and then examined for gel time in the same manner as in Examples 1 to 34. Their storage stability was determined by storing in a thermostat at a predetermined temperature (50° C.) and measuring the number of days until their fluidity was lost.

TABLE 6

| | | |
|---|---|---|
| Epoxy Compound | Epicoat #807 | 100 wt. parts |
| Curing agent | Dicyandiamide | 8 wt. parts |
| Curing accelerator | Inventive latent curing agent or Curing agent of Comparative Production Example | 5 wt. parts |
| Additive | "Aerozil #200" ex Japan Aerozil Co., Ltd. | 1 wt. part |

The obtained results are shown in Table 7 below.

TABLE 7

| | Curing accelerator Sample No. | Curability (Gel time) temperature | time | Storage Stability (50° C.) |
|---|---|---|---|---|
| Example 35 | 23 | 100° C. | 13 min. | more than 3 months |
| Example 36 | 30 | 100° C. | 16 min. | more than 3 months |
| Comparative Example 6 | Comparative 4 | 100° C. | 13 min. | 2 weeks |
| Comparative Example 7 | No curing accelerator | 100° C. | More than 60 min. | more than 3 months |

Examples 37 to 38 and Comparative Examples 8 to 9

To examine the performance of the inventive latent curing agent for epoxy resin when used in combination with other latent curing agents, curable epoxy resin compositions were formulated at the ratio shown in Table 8 below and then examined for gel time and storage stability in the same manner as in Examples 1 to 34.

TABLE 8

| | | |
|---|---|---|
| Epoxy Compound | Epicoat #807 | 100 wt. parts |
| Curing agent | Adipic acid hydrazide | 20 wt. parts |
| Curing accelerator | Inventive latent curing agent or Curing agent of Comparative Production Example | 5 wt. parts |
| Additive | "Aerozil #200" ex Japan Aerozil Co., Ltd. | 1 wt. Part |

The obtained results are shown in Table 9 below.

TABLE 9

| | Curing accelerator | Curability (Gel time) | | Storage Stability |
|---|---|---|---|---|
| | Sample No. | temperature | time | (54° C.) |
| Example 37 | 23 | 100° C. | 10 min. | more than 3 months |
| Example 38 | 30 | 100° C. | 15 min. | more than 3 months |
| Comparative Example 8 | Comparative 4 | 100° C. | 10 min. | 3 weeks |
| Comparative Example 9 | No curing accelerator | 100° C. | More than 60 min. | more than 3 months |

As can be seen from the foregoing, the latent curing agent for epoxy resin of the present invention can confer very excellent storage stability and low-temperature rapid curable properties on an epoxy resin composition into which said curing agent was incorporated.

According to the first invention as has been described above, curable epoxy resin compositions which are very excellent in storage stability and rapidly curable at low temperatures, can be easily obtained. The curable epoxy resin composition of the present invention is rapidly curable at low temperatures, is excellent in heat resistance, electrical reliability, etc., and is suitable for use in the electronics field such as encapsulants for semiconductor, anisotropic conductive films, conducting composites, etc.

Hereinafter, Examples of the second invention will be described. The abbreviations for the starting materials used in Production Examples and Examples are as follows;

Alicyclic epoxy compound used as Compound (a);
<EP-C1> 3,4-epoxycyclohexylmethyl-3,4-epoxycyclohexyl carboxylate (epoxy equivalent, 134, no hydrolyzable chlorine).

Compounds used as compound (b);
<2E4MZ> 2-ethyl-4-methyl imidazole (chlorine ion content, 2 ppm);
<PG-MZ> 1-(2-hydroxy-3-phenoxypropyl)-2-methyl imidazole (chlorine ion content, 70 ppm);
<DMP-30> 2,4,6-tris(dimethylaminomethyl) phenol (chlorine ion content, 5 ppm).

Compounds used as Compound (c);
<BA> bisphenol A (chlorine ion content, 0.8 ppm),
<PNV> phenol novolak resin (hydroxyl group equivalent, 104; average number of nuclei, 5 to 6; chlorine ion content, 0.3 ppm),
<AA> adipic acid (chlorine ion content, 10 ppm).

Epoxy compounds used as Component (d);
<EP-G1> bisphenol A type epoxy resin (epoxy equivalent, 184; hydrolyzable chlorine, 100 ppm),
<EP-G2> bisphenol F type epoxy resin (epoxy equivalent, 166; hydrolyzable chlorine, 150 ppm),
<EP-G3> bisphenol A type epoxy resin (epoxy equivalent, 189; hydrolyzable chlorine, 1,000 ppm).

The amount of hydrolyzable chlorine in the epoxy compound was examined in the following method. That is, the epoxy compound was dissolved in dioxane, and 1 N potassium hydroxide in ethanol was added thereto, and the mixture was heated under reflux for 30 minutes. The chloride ions formed were quantified by potentiometric titration using 0.01 N silver nitrate standard solution.

Production Example 1
(Reaction Product of EP-C1, EP-G2, 2E4MZ and PNV)

132 g (1.2 equivalents) of 2E4MZ and 126 g (1.2 equivalents) of PNV were placed in a beaker, uniformly dissolved by heating at 130° C. for 1 hour, cooled to 100° C., mixed at room temperature with a mixture previously heated to 70° C. of 201 g (1.5 equivalents) of EP-C1 and 50 g (0.3 equivalents) of EP-G2. The resulting mixture was maintained for reaction for 1 hour at a temperature of 110 to 130° C. by cooling or heating. After the reaction was finished, the reaction mixture was cooled to room temperature to give a pale yellow solid. This addition product was roughly ground and then finely ground to give a powder of about 10 $\mu$m in the average diameter. This latent curing agent for epoxy resin will be referred to as Sample No. 1.

The sample number of the inventive latent curing agent for epoxy resin produced according to Production Example 1, as well as the composition of the starting materials thereof, are shown in Table 1 below.

TABLE 1

| Sample No. | Ingredient (a) (*1) | | Ingredient (b) (*2) | | Ingredient (c) (*3) | | a/(b + c) (equivalent ratio) |
|---|---|---|---|---|---|---|---|
| 1 | EP-G2 | (0.3) | 2EtMZ | (1.2) | PNV | (1.2) | 0.75 |
|  | EP-Cl | (1.5) |  |  |  |  |  |
| 2 | EP-Cl | (2.0) | PGMZ | (1.0) | PNV | (1.3) | 0.67 |
|  |  |  | DMP-30 | (0.5) | BA | (0.2) |  |
| 3 | EP-G1 | (0.4) | 2E4MZ | (1.2) | PNV | (1.0) | 0.71 |
|  | EP-Cl | (1.6) | DMP-30 | (0.3) | BA | (0.3) |  |
| 4 | EP-Cl | (1.8) | 2E4MZ | (1.2) | PNV | (1.2) | 0.75 |
| 5 | EP-Cl | (2.0) | PGMZ | (1.2) | PNV | (0.9) | 0.83 |
|  |  |  |  |  | AA | (0.3) |  |
| Comparative 1 | EP-G3 | (1.5) | 2EtMZ | (1.0) | PNV | (1.0) | 0.75 |
| Comparative 2 | EP-G3 | (1.5) | 2EtMZ | (1.0) | PNV | (0.6) | 0.63 |
|  |  |  | DMP-30 | (0.2) | BA | (0.6) |  |

*1: Parenthesized numerics indicate equivalent number of epoxy group.
*2: Parenthesized numerics indicate equivalent number of active hydrogen.
*3: Parenthesized numerics indicate equivalent number of active hydrogen.

Examples 1 to 5 and Comparative Example 1

Each latent curing agent for epoxy resin and epoxy resin 1 (bisphenol A type epoxy resin: epoxy equivalent, 185; hydrolyzable chlorine, 300 ppm) were mixed at the ratio shown in Table 2 below and defoamed for 30 minutes under reduced pressure in a vacuum mixing-grinding machine (ex Ishikawa Kojyo K. K.) to give each curable epoxy resin composition.

<Measurement of the Chloride Ion Content in the Latent Curing Agent for Epoxy Resin by Hot-water Extraction>

The chloride ion content in each latent curing agent for epoxy resin was determined by hot-water extraction. The amount of the chloride ions extractable with hot water was determined by placing 1 g of the latent curing agent of the present invention in a Teflon vessel, adding 15 ml purified water to it, sealing it, subjecting it to a pressure cooker test at 121° C. for 20 hours, and analyzing the resulting sample solution by the ion chromatography.

<Measurement of Gel Time>

Unless particularly specified, about 2.5 g of the curable epoxy resin composition was used and measured at each temperature shown in Table 2 by means of a Yasuda-type gel timer (ex Yasuda Seiki Seisakusho K. K.).

<Glass Transition Temperature>

The epoxy resin composition was cured in a thickness of 1 to 2 mm at 150° C. for 30 minutes and measured by a TMA (thermal mechanical analysis) method.

The obtained results are shown in Table 2.

TABLE 2

|  |  | Example 1 | Example 2 | Example 3 | Example 4 | Example 5 | Comparative example 1 |
|---|---|---|---|---|---|---|---|
| Epoxy resin 1 |  | 100 | 100 | 100 | 100 | 100 | 100 |
| Curing agent | Sample No. | No. 1 | No. 2 | No. 3 | No. 4 | No. 5 | Comparative 1 |
|  | Amount added | 20 | 20 | 20 | 20 | 20 | 20 |
|  | Cl(ppm) | 55 | 42 | 45 | 15 | 35 | 915 |
| Composition | Curing temperature | 100° C. | 120° C. | 100° C. | 120° C. | 120° C. | 120° C. |
|  | Gel time | 7 min. | 4 min. | 8 min. | 4 min. | 6 min. | 7 min. |
| Cured Product | Glass transition temp.(° C.) | 150 | 147 | 144 | 152 | 148 | 138 |
|  | Cl(ppm) | 40 | 65 | 40 | 35 | 40 | 150 | water to it, sealing it, subjecting it to a pressure cooker test at 121° C. for 20 hours, and analyzing the resulting sample solution by the ion chromatography.

<Measurement of the Chloride Ion Content in the Curable Epoxy Resin Composition by Hot-water Extraction>

The curable epoxy resin composition was cured by maintaining at 150° C. for 30 minutes, to give a cured product which was then ground, and its chloride ion content was determined by hot-water extraction. The amount of the chloride ions extractable with hot water was determined by placing 1 g of the above ground cured product in a Teflon vessel, adding 15 ml purified water to it, sealing it, subjecting it to a pressure cooker test at 121° C. for 20 hours, and analyzing the resulting sample solution by the ion chromatography.

From the results of Table 2 above, the inventive latent curing agent for epoxy resin is excellent in low-temperature rapid curing properties and is low in the chloride ion content extractable with hot water, and the curable epoxy resin composition of the present invention is high in glass transition temperature when cured, excellent in heat resistance, and low in chlorine content. Each of the curable epoxy resin compositions of Examples was placed in a sealed vessel and stored in a thermostat at 40° C., and the number of days until its fluidity was lost was determined, and as a result, it exhibited excellent storage stability as long as 1 to 2 months.

Examples 6 to 9 and Comparative Example 2

Epoxy resin 2 (bisphenol F type epoxy resin, 150 ppm hydrolyzable chlorine) and Epoxy resin 3 (resorcinol diglycidyl ether, 100 ppm hydrolyzable chlorine), each latent curing agent, and silver powder (Silver powder A: flake-shaped silver powder of 1 to 10 microns in diameter, Silver powder B: spherical silver powder of 0.1 to 0.5 micron in diameter) were blended at the mixing ratio shown in Table 3 below to give a curable epoxy resin composition in a vacuum mixing-grinding machine (3 rolls).

<Volume Resistivity>

Each resulting curable epoxy resin composition was applied in a width of 4 mm and a thickness of 30 microns onto a slide glass, then cured at 110° C. for 30 minutes or 150° C. for 30 minutes, and examined for its volume resistivity.

<Chloride Ion Content in the Cured Product>

A cured product which had been obtained from the curable epoxy resin composition in the same manner, as in the measurement of volume resistivity was ground, and the chloride ion content extractable with hot water in the same manner as in Examples 1 to 5 was quantified.

The obtained results are shown in Table 3 as well.

TABLE 3

|  |  | Example 6 | Example 7 | Example 8 | Example 9 | Comparative Example 1 |
|---|---|---|---|---|---|---|
| Epoxy resin 2 |  | 60 | 60 | 60 | 60 | 60 |
| Epoxy resin 3 |  | 30 | 30 | 30 | 30 | 30 |
| Curing agent | Sample No. | No. 1 | No. 2 | No. 3 | No. 4 | Comparative 2 |
|  | Amount added | 15 | 15 | 15 | 15 | 15 |
| Silver Powder A (flake-shaped) |  | 380 | 380 | 380 | 380 | 380 |
| Silver Powder B (spherical) |  | 60 | 60 | 60 | 60 | 60 |
| Cured product | Volume resistivity, cured at 100° C. for 30 min. ($\Omega \cdot cm$) | $7 \times 10^{-4}$ | $8 \times 10^{-4}$ | $8 \times 10^{-4}$ | $6 \times 10^{-4}$ | $2 \times 10^{-2}$ |
|  | Hot-water extraction | 8 | 9 | 8 | 8 | 40 |

As can be seen from Table 3, the curable epoxy resin composition of the present invention is excellent in electrical conductance when cured and is also low in chlorine content.

According to the second invention as has been described above, it is possible to obtain the latent curing agent for epoxy resin and the curable epoxy resin composition which are rapidly curing or curable at low temperatures, are excellent in heat resistance and electrical reliability, and when used in conducting composites, are also excellent in electrical conductance.

What is claimed is:

1. A latent curing agent for epoxy resin, comprising a reaction product obtainable by allowing (A) an epoxy compound having more than one epoxy groups on the average in the molecule, (B) a compound having in the molecule both a tertiary amino group and at least one functional group having an active hydrogen selected from the group consisting of OH group, SH group, NH group, $NH_2$ group, COOH group and $CONHNH_2$ group, and (C) a compound having in the molecule at least one functional group having an active hydrogen selected from the group consisting of $NH_2$ group and $CONHNH_2$ group or having in the molecule at least two functional groups selected from the group consisting of OH group, SH group, NH group, $NH_2$ group, COOH group and $CONHNH_2$ group, provided that a compound having an epoxy group or tertiary amino group in the molecule is excluded, to react on one another in the presence of 0.05 to 5.0 equivalents of water per 1 equivalent of the epoxy group of Compound (A);

wherein when compound B) is a compound having in the molecule both a tertiary amino group and at least one functional group having an active hydrogen selected from the group consisting of OH group, SH group, COOH group and $CONHNH_2$ group, 0.5–2.5 equivalents of the epoxy group of Compound (A) is used per 1 equivalent of the total active hydrogen in both compounds (B) and (C); or when compound (B) is a compound having in the molecule both a tertiary amino group and at least one functional group having an active hydrogen selected from the group consisting of NH group and $NH_2$ group, 0.2–1.1 equivalents of Compound (A) is used per 1 equivalent of the active hydrogen in the functional group of both Compounds (B) and (C).

2. The latent curing agent for epoxy resin as set forth in claim 1 wherein said Compound (C) is a polyhydric phenol compound.

3. The curable epoxy resin composition as set forth in claim 2 which comprises further (z) inorganic filler(s).

4. The latent curing agent for epoxy resin as set forth in claim 1 wherein said Compound (B) is a phenol compound containing a tertiary amino or an alcohol compound containing a tertiary amino group.

5. A curable epoxy resin composition comprising (x) an epoxy compound having more than one (1) epoxy groups on the average in the molecule and (y) the latent curing agent for epoxy resin as set forth in claim 1, as the essential ingredients.

6. A latent curing agent for epoxy resin, comprising a reaction product obtainable by allowing (a) an alicyclic epoxy compound having two or more epoxy groups in the molecule; (b) a compound having in the molecule both a tertiary amino group and at least one functional group having an active hydrogen selected from the group consisting of OH group, SH group, NH group, $NH_2$ group, COOH group and $CONHNH_2$ group; and (c) a compound having in the molecule at least one functional group having an active hydrogen selected from the group consisting of $NH_2$ group and $CONHNH_2$ group or having in the molecule at least two functional groups having an active hydrogen selected from the group consisting of OH group, SH group, NH group and COOH group, provided that a compound having an epoxy group or tertiary amino group in the molecule is excluded, to react on one another;

wherein when compound (b) is a compound having in the molecule both a tertiary amino group and at least one functional group having an active hydrogen selected from the group consisting of OH group, SH group, COOH group and CONHNH$_2$ group, 0.5–2.5 equivalents of the epoxy group of compound (a) is used per 1 equivalent of the active hydrogens in compounds (b) and (c); or when compound (b) is a compound having in the molecule a tertiary amino group and at least one functional group having an active hydrogen selected from the group consisting of NH group and NH$_2$ group, 0.2–1.1 equivalents of the epoxy group of compound (a) is used per 1 equivalent of the active hydrogen in the functional group of compounds (b) and (c).

7. The latent curing agent for epoxy resin as set forth in claim 6 wherein said Compound (b) is a compound having in the molecule both a tertiary amino group and at least one functional group selected from the group consisting of OH group, NH group and NH$_2$ group.

8. The latent curing agent for epoxy resin as set forth in claim 6 wherein said Compound (c) is a polyhydric phenol compound.

9. A curable epoxy resin composition comprising the latent curing agent for epoxy resin as set forth in claim 6 and an epoxy compound having 2 or more epoxy group in the molecule.

10. A curable epoxy resin composition comprising the latent curing agent for epoxy resin as set forth in claim 6, an epoxy compound having 2 or more epoxy groups in the molecule, and an inorganic filler.

11. A latent curing agent for epoxy resin, comprising a reaction product obtainable by allowing (a) an alicyclic epoxy compound having two or more epoxy groups in the molecule; (b) a compound having in the molecule both a tertiary amino group and at least one functional group having an active hydrogen selected from the group consisting of OH group, SH group, NH group, NH$_2$ group, COOH group and CONHNH$_2$ group; (c) a compound having in the molecule at least one functional group having an active hydrogen selected from the group consisting of NH$_2$ group and CONHNH$_2$ group or having in the molecule at least two functional groups selected from the group consisting of OH group, SH group, NH group and COOH group, provided that a compound having an epoxy group or tertiary amino group in the molecule is excluded; and (d) a glycidyl compound having two or more epoxy groups in the molecule, to react on one another;

wherein when (b) is a compound having in the molecule both a tertiary amino group and at least one functional group having an active hydrogen selected from the group consisting of OH group, SH group, COOH group and CONHNH$_2$ group, 0.5–2.5 equivalents of the epoxy groups in both compounds (a) and (d) are used per 1 equivalent of all the active hydrogens in the functional group of compounds (b) and (c); or when compound (b) is a compound having in the molecule both a tertiary amino group and at least one functional group having an active hydrogen selected from the group consisting of NH group and NH$_2$ group, 0.2–1.1 equivalents of the epoxy group in both compounds (a) and (d) is used per 1 equivalent of the active hydrogen in the functional group of both compounds (b) and (c).

12. The latent curing agent for epoxy resin as set forth in claim 11, wherein said Compound (b) is a compound having in the molecule both a tertiary amino group and at least one functional group selected from the group consisting of OH group, NH group and NH$_2$ group.

13. The latent curing agent for epoxy resin as set forth in claim 11, wherein said Compound (c) is a polyhydric phenol compound.

14. A curable epoxy resin composition comprising the latent curing agent for epoxy resin as set forth in claim 11 and an epoxy compound having two or more epoxy groups in the molecule.

15. A curable epoxy resin composition comprising the latent curing agent for epoxy resin as set forth in claim 11, an epoxy compound having two or more epoxy groups in the molecule, and an inorganic filler.

* * * * *